US008608365B2

United States Patent
Tseng

(10) Patent No.: US 8,608,365 B2
(45) Date of Patent: Dec. 17, 2013

(54) BACKLIGHT FIXING DEVICE WITH ADJUSTABLE TEST ANGLE

(75) Inventor: Shun-Chi Tseng, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 978 days.

(21) Appl. No.: 12/630,964

(22) Filed: Dec. 4, 2009

(65) Prior Publication Data

US 2010/0290210 A1 Nov. 18, 2010

(30) Foreign Application Priority Data

May 18, 2009 (CN) .......................... 2009 1 0302395

(51) Int. Cl.
*F21V 7/04* (2006.01)
(52) U.S. Cl.
USPC ............... 362/633; 362/97.2; 349/58; 349/61
(58) Field of Classification Search
USPC ............ 362/97.1, 632–634, 97.2; 349/58, 61; 248/298.1
See application file for complete search history.

(56) References Cited

U.S. PATENT DOCUMENTS

| | | | | |
|---|---|---|---|---|
| 5,233,502 A * | 8/1993 | Beatty et al. | ............. | 361/679.09 |
| 6,262,785 B1 * | 7/2001 | Kim | ................................ | 349/58 |
| 7,460,364 B2 * | 12/2008 | Yang | ........................ | 361/679.27 |
| 7,848,091 B2 * | 12/2010 | Han et al. | ................. | 361/679.26 |
| 8,018,715 B2 * | 9/2011 | Chang | ........................ | 361/679.04 |
| 2006/0244700 A1 * | 11/2006 | Sano et al. | ....................... | 345/87 |
| 2008/0232134 A1 * | 9/2008 | Weng et al. | ................... | 362/612 |

* cited by examiner

*Primary Examiner* — Jason Moon Han
*Assistant Examiner* — Jessica M Apenteng
(74) *Attorney, Agent, or Firm* — Altis Law Group, Inc.

(57) ABSTRACT

A backlight fixing device includes a base plate, a first slidable unit and a second slidable unit. The base plate includes an L-shaped bar formed on an upper surface of the base plate protruding from edges of two adjacent sides of the base plate. A first guiding groove and a second guiding groove are defined in the upper surface of the base plate and extended perpendicularly from the other two adjacent sides of the base plate towards a central area of the base plate correspondingly. The first slidable unit is movably attached to base plate to be movable along the first guiding groove. The second slidable unit is movably attached to base plate to be movable along the second guiding groove. The first slidable unit, the second slidable unit and the L-shaped bar form a receiving space for accommodating a backlight module.

5 Claims, 3 Drawing Sheets

BACKLIGHT FIXING DEVICE WITH ADJUSTABLE TEST ANGLE

BACKGROUND

1. Technical Field

The present disclosure relates to a backlight fixing device, and more particularly to a backlight fixing device with adjustable test angle.

2. Description of Related Art

LCDs have the advantages of portability, low power consumption, and low radiation, and have been widely used in various portable information products such as notebooks, personal digital assistants (PDAs), video cameras and the like. Furthermore, LCDs are considered by many to have the potential to completely replace CRT (cathode ray tube) monitors and televisions. Because liquid molecules in LCDs can not emit light itself, an LCD normally includes a backlight module to illuminate an LCD panel of the LCD. Before an LCD leaves a factory, a test such as a brightness and evenness degree test is performed to the backlight of the LCD to ensure the quality of the LCD. Thus, a backlight fixing device is needed to be provided to fasten the backlight module of the LCD in test to make a precise test.

It is thus desirable to provide a backlight fixing device which can overcome the described limitation.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
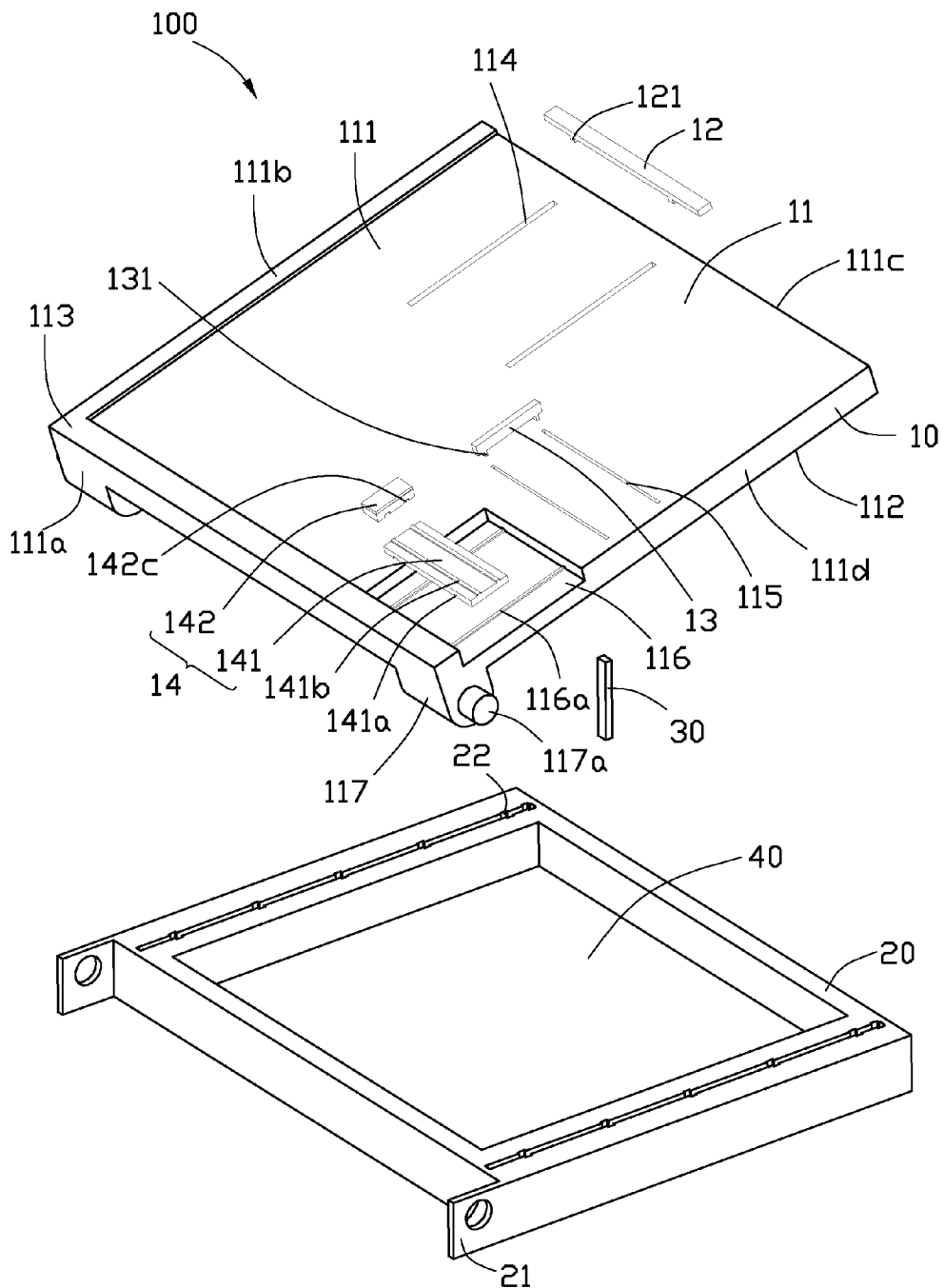
FIG. 1 is schematic, exploded solid view of a backlight fixing device in accordance with one embodiment.
Figure 2:
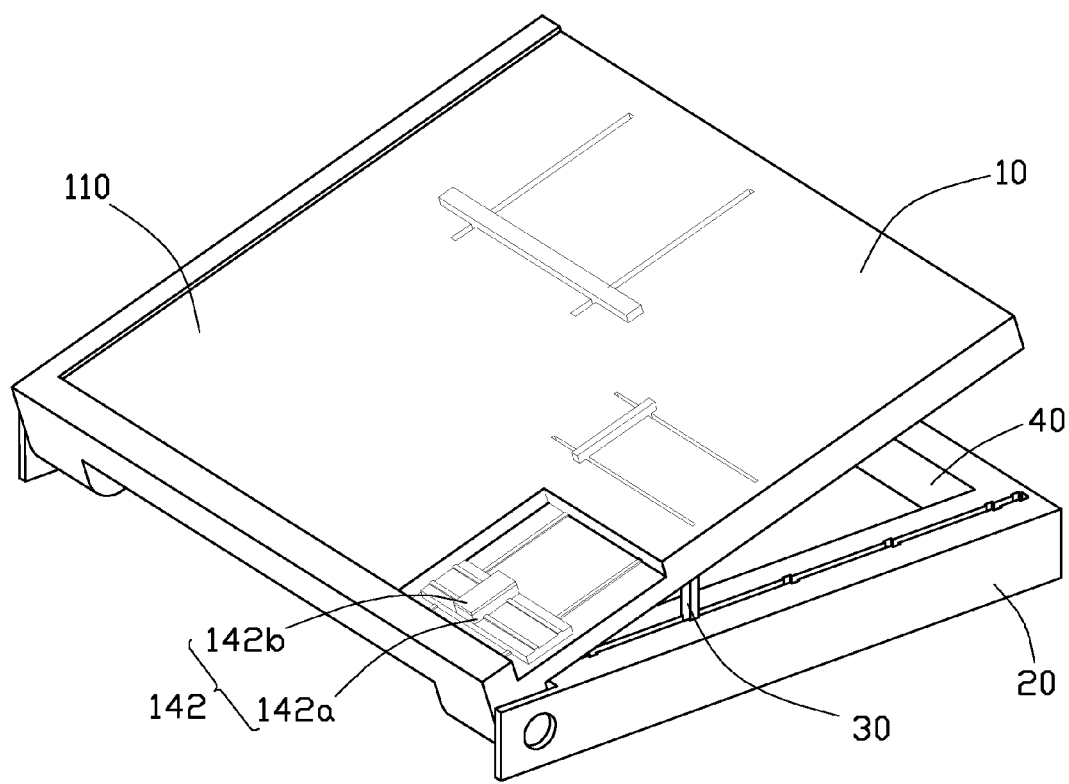
FIG. 2 is schematic, solid view showing assembly of the backlight fixing device of FIG. 1.
Figure 3:
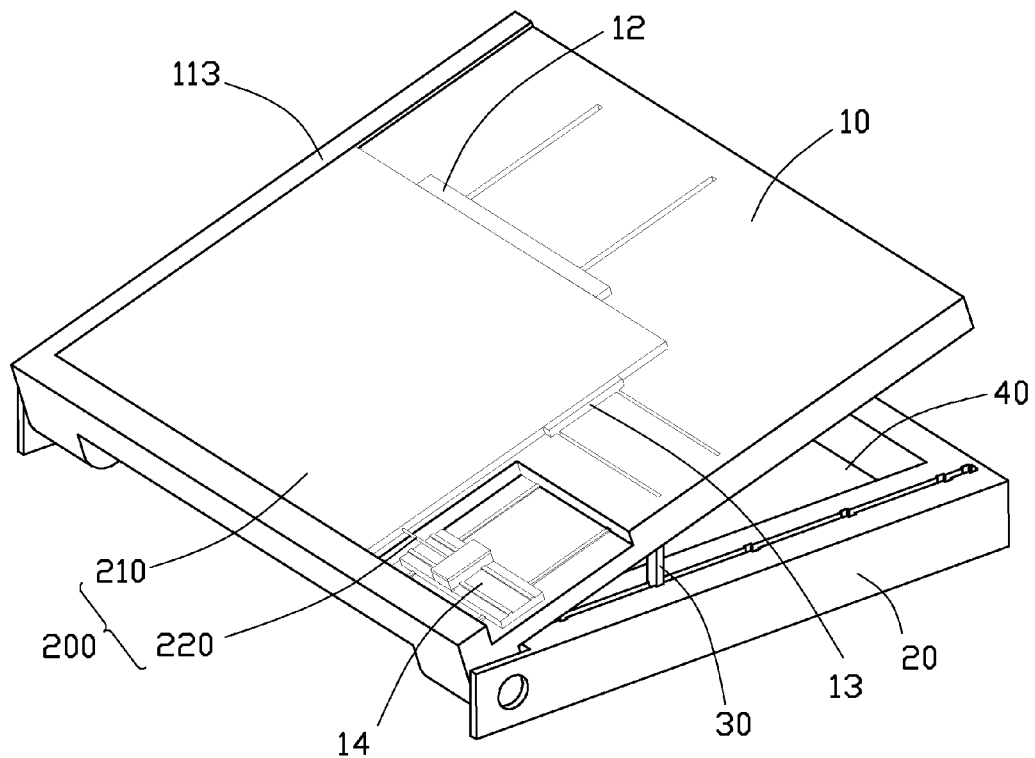
FIG. 3 is schematic, solid view showing assembly of the backlight fixing device of FIG. 1 together with a backlight module.

Referring to FIG. 1-FIG. 3, a backlight fixing device 100 according to one embodiment of the present disclosure is shown. The backlight fixing device 100 is used to fasten a backlight module 200. The backlight module 200 includes a body 210 and an electrical connecting terminal 220. The backlight fixing module 100 includes a base 10, a frame 20, and a supporting pole 30. The supporting pole 30 is interposed different locations between the base 10 and the frame 20 to maintain at least one constant angle between the base 10 and the frame 20.

The base 10 includes a base plate 11, a first slidable unit 12, a second slidable unit 13 and an interface module 14. The first slidable unit 12 and the second slidable unit 13 and the interface module 14 can be movably attached to the base plate 11.

The base plate 11 is a rectangular and includes a first upper surface 111 and a first under surface 112 opposite to the first upper surface 111. The first upper surface 111 includes a first side 111a, a second side 111b, a third side 111c, and a fourth side 111d connected to each other from beginning to end. The first upper surface 111 further includes an L-shaped bar 113 protruding from edges of the first side 111a and the second side 111b. The first upper surface 111 defines a pair of parallel first guiding grooves 114 and a pair of parallel second guiding grooves 115. The first guiding grooves 114 perpendicularly extend from a vicinity of the third side 111c towards a central area. The second guiding grooves 115 perpendicularly extend from a vicinity of the fourth side 111d towards the central area. The first upper surface 111 defines a recess 116 adjacent to the first side 111a and the fourth side 111d. The recess 116 includes two spaced guiding elements 116a elongated in parallel with the fourth side 111d. In this embodiment, the guiding elements 116a are guiding rails. The first and the second guiding grooves 114, 115 are not intersected with each other.

Two protrusions 117 adjacent to the first side 111a are formed on the first under surface 112 and positioned close to the second side 111b and the fourth side 111d correspondingly. Two axles 117a extend far away from each other from the two protrusions 117 correspondingly, towards two opposite directions. The first under surface 112 defines a plurality of first fixing holes therein adjacent to the second side 111b and the fourth side 111d correspondingly (not shown).

The first slidable unit 12 is elongated and includes two first slidable blocks 121 corresponding to the two first guiding grooves 114. The first slidable unit 12 is parallel to the third side 111c and slidably attached to the base plate 11 by inserting the first slidable blocks 121 of the first slidable unit 12 into the first guiding grooves 114 of the first upper surface 111 correspondingly.

The second slidable unit 13 is elongated and includes two second slidable blocks 131 corresponding to the two second guiding grooves 115. The slidable unit 13 is parallel to the fourth side 111d and slidably attached to the base plate 11 by inserting the second slidable blocks 131 of the second slidable unit 13 into the second guiding grooves 115 of the first upper surface 111 correspondingly.

In this embodiment, the L-shaped bar 113, the first slidable unit 12, and the second slidable unit 13 define a test receiving space 110 for accommodating the body 210 of the backlight module 200.

The interface module 14 includes a third slidable unit 141 and a power socket 142. The third slidable unit 141 is rectangular and includes a second under surface defining two first sliding grooves 141a corresponding to the two first guiding elements 116a. The third slidable unit 141 further includes a second upper surface on another side of the third slidable unit 141 opposite to the second under surface. The second upper surface of the third slidable unit 141 defines two second guiding elements 141b therein elongated perpendicular to the first guiding elements 116a. The third slidable unit 141 is movably received in the recess 116 by inserting the first guiding elements 116a into the first sliding grooves 141a correspondingly. In this embodiment, the second guiding elements 141b are guiding rails.

The power socket 142 include a socket body 142a and a cover 142b connected to the socket body 142. A rotatable device (not shown) is provided to open the cover 142b to expose the socket body 142a. The socket body 142a includes two second sliding groove 142c corresponding to the two second guiding elements 141b. The socket body 142a is attached to the third slidable unit 141 by inserting the second guiding elements 141b into the second sliding grooves 142c respectively.

In an alternative embodiment, the first guiding elements 116a and the second guiding elements 141b are guiding grooves and the first sliding groove 141a and the second sliding groove 142c are replaced by guiding rails.

The frame 20 is a rectangular and includes a pair of axle sleeves 21 adjacent to an end corresponding to the two axles 117a of the base plate 11. A plurality of second fixing holes 22 are defined at opposite sides of the frame 20 spatially corresponding to the first fixing holes. The base 10 is rotatably connected to the frame 20 by engagement of the two axles 117a and the axle sleeves 21.

At the beginning of assembly, the base 10 and the frame 20 form a pre-receiving space 40 to accommodate the backlight module 200. It is convenient to carry the backlight module 200 by disposing the backlight module 200 into the pre-receiving space 40. furthermore, the pre-receiving space 40 can prevent damages to the backlight module 200.

To perform a brightness and evenness degree test on the backlight module 200, the backlight module 200 can be taken out from the pre-receiving space 40 and positioned on the base plate 11 such that the body 210 of the backlight module 200 is received in the test receiving space 110 and the electrical terminal 220 is received in the recess 116.

Then, the backlight module 200 is displaced to abut two adjacent sides of the body 210 against the bar 113. The first slidable unit 12 and the second slidable unit 13 are displaced to against the other two adjacent sides of the body 210 correspondingly.

Finally, the third slidable unit 141 is moved along the first guiding element 116a, and the socket body 142a is moved along the second guiding element 141b, and the cover 142b is opened to connect the electrical terminal 220 to the socket body 142a.

When a test angle needs adjusted, the base 10 is rotated and two ends of the supporting pole 30 is selectively inserted into one of the first fixing holes and one of the second fixing holes 22 correspondingly. In this embodiment, the test angle can be adjusted to be 30, 45, 60 degrees by selectively inserting two ends of the supporting pole 30 to different first and second fixing holes. Thus, a test device above the backlight module 200 can test the brightness and evenness of the backlight module 200 at different test angles.

Because the backlight fixing device 100 of present disclosure includes a first slidable unit 12 and a second slidable unit 13 to fasten the backlight module in two different directions correspondingly, the backlight module 200 can be securely fastened during testing for a more accurate and precision test.

In an alternative embodiment, number of the first and second guiding grooves 114, 115 and their corresponding first and second slidable blocks 121, 131 can be one. Similarly, number of the first and second guiding elements 116a, 141b and their corresponding first and second sliding grooves 141a, 142c can be one.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A backlight fixing device, comprising:
a base plate comprising:
a first side, a second side connected to the first side, a third side opposite to the first side, and a fourth side opposite to the second side and connected to the third side, the first through fourth sides being connected to each other from beginning to end in that order, the first side and the second side defining two adjacent sides of the base plate, the third side and the fourth side defining another two adjacent sides of the base plate,
an L-shaped bar formed on an upper surface of the base plate protruding from edges of the two adjacent sides of the base plate,
a first guiding groove and a second guiding groove defined in the upper surface of the base plate, which correspondingly extend perpendicularly from the other two adjacent sides of the base plate towards a central area of the base plate, and
a recess defined in the upper surface of the base plate adjacent to the second guiding groove, a first elongated guiding element perpendicular to the second guiding groove being formed in the recess, and the first guiding element being a guiding rail,
a first slidable unit movably attached to the base plate and being movable along the first guiding groove,
a second slidable unit movably attached to base plate and being movable along the second guiding groove, and
an interface module movably received in the recess and being movable along the first guiding element, the interface module comprising a third slidable unit and a power socket, and the third slidable unit comprising a sliding groove defined in an underside surface thereof for engagably receiving the first guiding element,
wherein the first slidable unit, the second slidable unit and the L-shaped bar form a receiving space for accommodating a backlight module, and the interface module is configured for removably electrically connecting to the backlight module.

2. The backlight fixing device of claim 1, wherein the third slidable unit further comprises a second guiding element defined in an upper surface thereof opposite to the underside surface thereof, and the second guiding element is elongated perpendicular to the first guiding element.

3. The backlight fixing device of claim 2, wherein the power socket comprises a socket body and a cover connected to the socket body, and the cover can be opened to expose the socket body.

4. The backlight fixing device of claim 3, wherein the socket body comprises a second sliding groove for engagably receiving the second guiding element, and the socket body is movably attached to the third slidable unit and is movable along the second guiding element.

5. The backlight fixing device of claim 4, wherein the second guiding element is a guiding rail.

* * * * *